Dec. 31, 1963    V. CHANARYN ETAL    3,116,082
RELEASABLE FASTENING DEVICES
Filed Nov. 8, 1960    2 Sheets-Sheet 1

INVENTORS
VICTOR CHANARYN
GORDON ALFRED HABGOOD
BY Irwin S. Thompson
ATTORNEY

Dec. 31, 1963    V. CHANARYN ETAL    3,116,082
RELEASABLE FASTENING DEVICES

Filed Nov. 8, 1960    2 Sheets-Sheet 2

INVENTOR
VICTOR CHANARYN
GORDON ALFRED HABGOOD
BY Irwin S. Thompson
ATTORNEY

United States Patent Office 3,116,082
Patented Dec. 31, 1963

3,116,082
RELEASABLE FASTENING DEVICES
Victor Chanaryn, Solihull, and Gordan Alfred Habgood, Cotswold Close, Admington, Shipston-on-Stour, England, assignors to Wilmot-Breeden Limited, Birmingham, England
Filed Nov. 8, 1960, Ser. No. 68,113
15 Claims. (Cl. 292—224)

This invention relates to releasable fastening devices, more especially for vehicle doors.

Releasable fastening devices have come into common use, particularly for fastening vehicle doors, of a type which embody two parts between which angular and translatory movement occurs during the fastening operation, one of which parts is urged in the angular sense towards and into a relative coupling position and requires the application of a positive turning movement during a releasing operation. Examples of such fastening devices are described in the co-pending patent applications Nos. 66,131 filed October 31, 1960, and 847,307, now Patent No. 3,002,778 granted October 3, 1961. The parts are usually formed so that their engagement can act to urge the one part into the coupling position, and even though this part may be spring loaded into this position such formation ensures that the device will operate satisfactorily even in the event of spring failure.

The formation of the parts so that their engagement brings them into the relative coupling position normally requires a considerable degree of overtravel of the parts during the fastening operation, their engagement during this overtravel completing the relative angular movement. In applications in which overtravel is necessarily severely limited, as with railway carriage doors, it has been difficult to ensure that the parts can be turned to their relative coupling position as a result of engagement during the overtravel.

The object of the invention is to provide a releasable fastening device of the above type in which engagement of the two parts ensures them reaching the relative coupling position when used with a vehicle door with which overtravel of the parts is severely limited.

According to a further object of the invention a releasable fastening device comprises two parts which undergo relative translatory and angular movement during the fastening operation to a coupling position and wherein each part is formed with first and second surface portions spaced apart in a direction parallel to the axis of said relative angular movement, the portions being arranged so that, during the fastening operation, engagement of said first portions produces relative angular movement between the parts to bring them to said coupling position in which coupling engagement occurs between said second portions.

Preferably the parts have complementary steps which provide said surface portions and one of the parts takes the form of a cam rotatably mounted about a fixed axis disposed transversely of said relative translatory movement whilst the other part remains fixed at least in the angular sense. The latter part, which may for example be arranged for mounting on a vehicle body pillar, is preferably of integral construction and may take the form of a G-shaped striker and keeper, a portion within the jaws of the G being stepped to provide said first and second surface portions.

The cam may be spring loaded towards its coupling position and conveniently has two spaced lobes which project outwardly from the face of the cam for different distances in a direction parallel to the rotational axis of the cam, one of said lobes providing the first surface portion and the other of said lobes providing the second surface portion. Conveniently the lobe which projects further from the cam face, hereinafter termed the "longer lobe," provides the first surface portion and the other or shorter lobe provides the second surface portion for coupling engagement.

The formations of the second surface portions on the shorter lobe and the striker are preferably such that, as described in the aforesaid Patent No. 3,002,778, the reaction force between them as a result of any tendency for reverse relative translatory movement of the parts when coupled is substantially aligned with the direction of such movement and produces substantially no torque about the rotational axis of the cam; when in coupling engagement said second surface portions may contact each other substantially at the axis of said relative angular movement.

The striker may be formed so that, if the door closing movement is not completed after the cam has entered the striker, the longer lobe of the latter on return movement of the door engages one jaw of the striker to provide a "safety lock" condition. In this condition the reaction force between the cam and striker as a result of any tendency for reverse relative translatory movement thereof conveniently passes through said rotational axis.

Guiding means may be provided to ensure correct engagement of the parts during the fastening operation and the means are desirably formed to enable such engagement to proceed smoothly in the event of some initial misalignment of the parts.

When the device is designed for use with a railway vehicle, for example a railway carriage door, it conveniently includes an external operating handle of elongated shape arranged to rotate the cam and to be disposed horizontally when the cam is in its coupling position and to be turned to an inclined position to rotate the cam from its coupling position thus enabling release of the device and opening of the door. In order that the position of the handle may give a positive indication that the door is securely fastened, a trip mechanism may be provided so that, when the handle is turned to its inclined release position and the door opened, the handle cannot be returned to its horizontally fastened position until the mechanism is tripped upon closing of the door. The arrangement may be such that with the door open the trip mechanism holds the cam in an uncoupled position aligned for engagement within the striker, and the trip mechanism is conveniently tripped by the striker to release the cam when the door is partially closed.

A railway carriage door fastening device forming one embodiment of the invention will now be described by way of example with reference to the accompanying drawings, in which.

Figure 1:
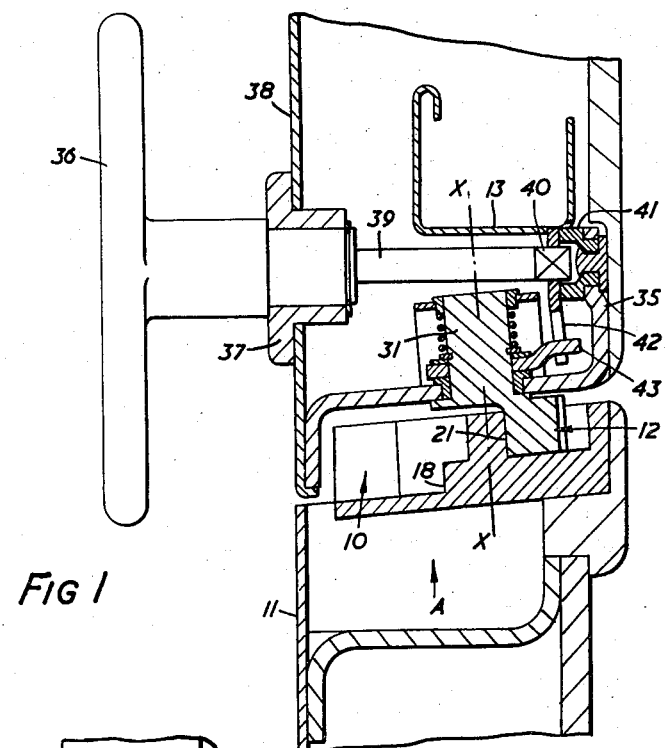
FIGURE 1 is a horizontal section through the device taken in a plane containing the rotational axis of the cam of the device.

Referring now to the drawings, the device comprises a stationary part in the form of a G-shaped striker and keeper 10 which is fixed to a body pillar 11 of the carriage and a rotatably mounted part or cam 12 carried by the corresponding door pillar 13. Both striker and cam are of stepped formation to provide first and second surface portions spaced apart in a direction parallel to the rotational axis of the cam, this axis being indicated at X—X in FIGURE 1 and being disposed at right angles to the edge of the door.

Figure 5:
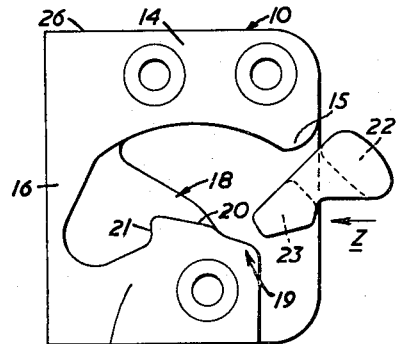
FIGURES 5, 6 and 7 are diagrams showing successive relative positions of the cam and striker during a fastening operation of the device.

The striker 10 is mounted on the body pillar 11 so that the G-shape is upright and so that the upper jaw 14 of the keeper has an inward bulge 15 at its free end (see FIGURE 5). The intermediate limb 16 and the lower jaw 17 of the striker are stepped to provide said first and second surface portions. The first surface portion 18 has a generally convex cam-like profile which commences adjacent the free end of the lower jaw 17 and terminates at the rear end of the upper jaw 14. The striker is also cut away to provide, at the free end of the lower jaw 17, the inwardly facing tail 19 of the G-shape which has an inclined outwardly facing surface portion 20 and a flat inwardly facing surface portion 21 which provides said second surface portion and which is slightly undercut with respect to a plane normal to the direction of relative translatory movement of the cam and striker during the fastening operation. It is apparent from FIGURE 1 that the surface portions 18 and 21 are spaced apart in a direction parallel to the axis X—X.

Figure 2:
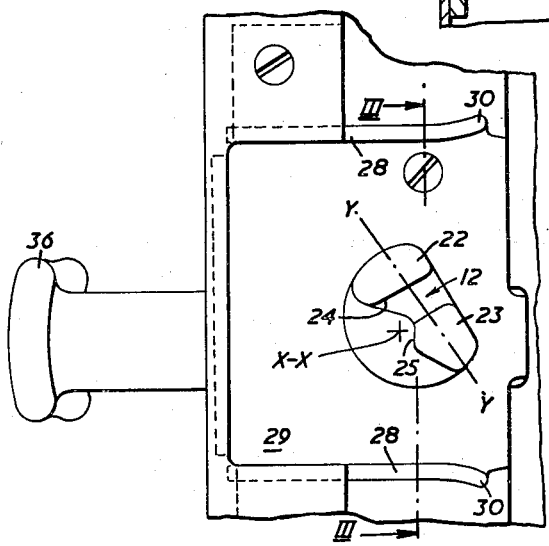
FIGURE 2 is a side elevation, looking in the direction of the arrow A in FIGURE 1, of the edge of the carriage door showing the cam.
Figure 3:
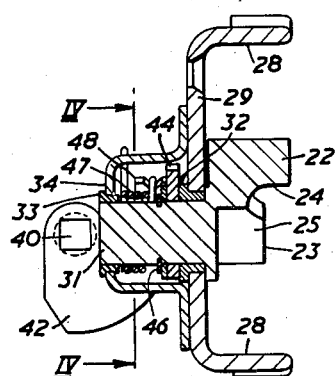
FIGURE 3 is a vertical section on the line III—III of FIGURE 2.

The cam 12 has two spaced lobes 22 and 23 which project outwardly from the cam in a direction parallel to its rotational axis; the lobes 22, 23 are of different length in that direction (see FIGURE 3) to provide first and second surface portions 24 and 25 respectively spaced apart in a direction parallel to the axis X—X. The cam 12 is spring loaded as will hereinafter be described in its positive coupling direction towards its coupling position shown in FIGURES 2 and 5 and in which the general centre line Y—Y of the two lobes is downwardly inclined at an angle of approximately 45° above said rotational axis X—X, with the leading or shorter lobe 23 disposed forwardly of this axis. In this position the substantially flat second surface portion 25 of the leading lobe 23 lies in a vertical plane normal to the direction Z of said relative translatory movement and disposed slightly in front of the rotational axis (see FIGURES 2 and 5). The trailing or longer lobe 22 provides the substantially flat first surface portion 24 which faces towards the leading lobs 23; the lob 22 is of generally rounded form around its remaining periphery.

Figure 6:
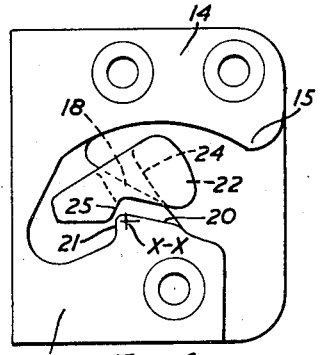
Figure 7:
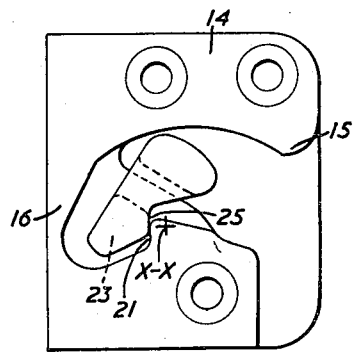

When the door is open the cam 12 is held in its normal coupled position by its spring loading against a stop which is described hereinafter. As the cam and striker approach during a fastening operation as shown in FIGURE 5 initial contact occurs between the trailing lobe 22 and the upper jaw 14 of the striker, and this rotates the cam slightly against the spring loading so that it is aligned for entry into the open mouth of the striker. Further relative translatory movement of the cam and striker moves the trailing lobe 22 under the inward bulge 15 until the first surface portions 18 and 24 on the striker and cam engage as shown in FIGURE 6 thus positively turning the cam into its coupling position as shown in FIGURE 7. This movement of the cam to its coupling position is to some extent assisted by the spring loading, but during normal closing of the door the spring loading is overridden and the first surface portion 18 of the striker acts to turn the cam to its coupled position. This ensures that the coupling position is reached with very little overtravel of the parts, even in the event of spring failure.

When the cam has been turned to its coupling or fully locked position relatively to the striker the second surface portion 25 of the leading lobe 23 engages the undercut second surface portion 21 of the tail of the striker with a substantially line contact at the level of, and substantially at, the rotational axis of the cam; preferably said contact is off-set slightly from the axis along the direction of said translatory movement to allow for wear and manufacturing tolerances, see FIGURE 7. Thus the reaction force between the co-acting surfaces 21 and 25, as a result of any tendency to separate the cam and striker in the horizontal direction, passes through the rotational axis of the cam and produces no torque on the latter tending to turn the cam in the uncoupling direction.

Figure 8:
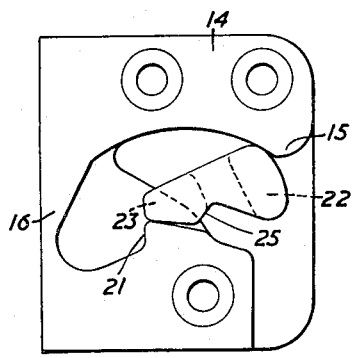
FIGURE 8 is a diagram showing the cam in a "safety lock" position within the striker.

If the door is slammed with insufficient force to effect complete engagemen of the cam and striker after the trailing lobe 22 of the cam has moved under the inward bulge 15 of the striker, opening of the door is prevented by engagement of the trailing lobe with the inward bulge as shown in FIGURE 8. This provides a condition of "safety lock" in which the cam resists any tendency to reopening of the door by said engagement of the trailing lobe 22 with the inward bulge 15 of the striker whilst the leading lobe 23 resists on the tail 18 of the G-shape at a point forwardly of the rotational axis. The spring loading acts to retain the leading lobe 23 in contact with said tail and the reaction force between the cam and striker passes substantially through said rotational axis so that no torque is produced tending to rotate the cam in the uncoupling direction.

The external surfaces 26 and 27 of the upper and lower jaws 14 and 17 of the striker are adapted to engage with the sides 28 of a channel-like backplate 29 fixed to the door pillar 13 and in which the cam 12 is rotatably mounted. Thus the backplate 29 forms a guide plate the sides of which act as guide elements which are outwardly flared at their forward ends 30 to ensure that the open end of the striker is correctly guided thereinto during the fastening operation.

The cam 12 is disposed on the outer side of the backplate 29 and has an integral cam spindle 31 projecting inwardly through a bearing 32 in the backplate with its inner end supported in an outrigger bearing 33 fixed to the backplate by an outrigger plate 34. A portion 35 of the backplate 29 is bent up at right angles along the forward edge of the latter and projects into the structure of the door.

Figure 4:
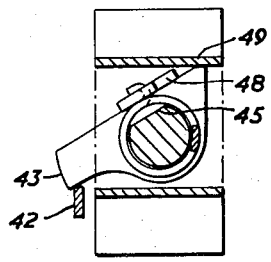
FIGURE 4 is a vertical section on the line IV—IV of FIGURE 3.

A door handle 36 of elongated shape is rotatably mounted in a bearing 37 in the outer door panel 38 and has a spindle 39 with a squared inner end section 40 received in a supporting bearing 41 on the bent up portion 35 of the backplate. A generally sector-shaped contactor plate 42 rotatably mounted in said supporting bearing 41 is engaged by said end portion 40 of the handle spindle and is arranged for engagement with an inwardly projecting arm 43 of a cam plate 44 fixed on the cam spindle 31 adjacent the backplate 29 by means of a flat 45 on the cam spindle and a circlip 46. A torsion spring 47 on the cam spindle with its ends engaged by the outrigger plate 34 and a lug 48 on the cam plate loads the cam towards the coupling position in which further movement of the cam is limited by abutment of the cam plate 44 at 49 with part of the outrigger plate 34 as shown in FIGURE 4.

Turning of the door handle 36 from its normal horizontal or "door closed" position turns the cam plate 44 and hence the cam 12 to an uncoupled position during opening of the door. With the cam in this position it can be withdrawn freely from the striker 10 and, on release of the handle, the cam 12 returns under the influence of the spring 47 to the normal or coupling position.

We claim:

1. A releasable fastening device for a hinged door, comprising a normally fixed part and a rotatably mounted part adapted for translatory and angular movement relatively to said fixed part during a fastening operation, when fitted said rotatably mounted part being arranged for rotation about an axis substantially parallel to the general door plane and substantially at right angles to the adjacent edge of the door, each of said parts being formed with first and second surface portions spaced apart in a direction parallel to said axis, the surface portions on the fixed part facing in generally opposite directions and the surface portions on the rotatably mounted part facing generally towards and being disposed on opposite sides of said axis relatively to which the first surface portion of the rotatably mounted part trails during the fastening operation, and the surface portions being arranged so that, during the fastening operation, engagement of said first portions produces relative angular movement between the parts to bring them to said coupling position in which coupling engagement occurs between said second portions and in which the reaction force between said fixed and rotatably mounted parts on any tendency for the door to open passes substantially through said axis.

2. A device according to claim 1, wherein said fixed part is a G-shaped striker and keeper having said first and second surface portions formed within the jaws of the G.

3. A device according to claim 1, wherein the second surface portions are so shaped and disposed that the reaction force between them as a result of any tendency for reverse relative translatory movement of the parts when coupled is substantially aligned with the direction of such movement and produces substantially no torque about said axis of relative angular movement.

4. A device according to claim 3, wherein, when the second surface portions are in coupling engagement, they contact each other substantially at the axis of said relative angular movement.

5. A device according to claim 4, wherein, when the second surface portions are in coupling engagement they contact each other at a position off-set from said axis along the direction of said translatory movement.

6. A releasable fastening device for a hinged door, comprising a normally fixed part and a rotatably mounted part adapted for translatory and angular movement relatively to said fixed part during a fastening operation, when fitted said rotatably mounted part being arranged for rotation about an axis substantially parallel to the general door plane and substantially at right angles to the adjacent edge of the door, each of said parts being formed with complementary steps presenting first and second surface portions spaced apart in a direction parallel to said axis, the surface portions on the fixed part facing in generally opposite directions and the surface portions on the rotatably mounted part facing generally towards and being disposed on opposite sides of said axis relatively to which the first surface portion of the rotatably mounted part trails during the fastening operation, and the surface portions being arranged so that, during the fastening operation, engagement of said first portions produces relative angular movement between the parts to bring them to said coupling position in which coupling engagement occurs between said second portions and in which the reaction force between said fixed and rotatably mounted parts on any tendency for the door to open passes substantially through said axis.

7. A releasable fastening device for a door, comprising a normally fixed keeper and a rotatably mounted cam adapted for translatory and angular movement relatively to said fixed part during a fastening operation, when fitted said rotatably mounted parts being arranged for rotation about an axis substantially parallel to the general door plane and substantially at right angles to the adjacent edge of the door, and spring means urging said cam towards a coupling position, each of said parts being formed with first and second surface portions spaced apart in a direction parallel to said axis, the surface portions on the fixed part facing in generally opposite directions and the surface portions on the rotatably mounted part facing generally towards and being disposed on opposite sides of said axis relatively to which the first surface portion of the rotatably mounted part trails during the fastening operation, and the portions being arranged so that, during the fastening operation, engagement of said first portions produces relative angular movement of said cam away from and back to said coupling position in which coupling engagement occurs between said second portions and in which the reaction force between said fixed and rotatably mounted parts on any tendency for the door to open passes substantially through said axis.

8. A device according to claim 7, including an external operating handle of elongated shape arranged to rotate the cam and to be disposed horizontally when the cam is in its coupling position and to be turned to an inclined position to rotate the cam from its coupling position thus enabling release of the device.

9. In a vehicle door having substantially no overtravel past the fastened position during a fastening operation, a releasable fastening device comprising a cam rotatably mounted about an axis extending at right angles to the adjacent edge of the door, and a fixed keeper adapted for coupling engagement with said cam, said cam having two lobes disposed on opposite sides of said axis and spaced apart in a direction parallel to the latter, said lobes respectively presenting first and second surface portions of the cam, the first of which trails the axis during the fastening operation, and said keeper having similarly spaced apart first and second surface portions for engagement respectively by said first and second surface portions of said cam, the arrangement being such that during the fastening operation engagement of said first surface portions during the fastening operation can turn said cam to a coupling position in which said second surface portions are in coupling engagement and in which the reaction force between said cam and keeper on any tendency for the door to open passes substantially through said axis.

10. A device according to claim 9, wherein, if engagement of said second surface portions is not effected after the cam has entered the keeper, the lobe which projects further from the cam face engages a jaw of the striker upon reverse relative translatory movement of the parts to provide a "safety lock" condition.

11. A device according to claim 9, wherein the lobe which projects further from the cam face provides the first surface.

12. In or for a vehicle door having substantially no overtravel past the fastened position during a fastening operation, a releasable fastening device comprising a cam rotatably mounted about an axis extending at right angles to the adjacent edge of the door, a fixed keeper adapted for coupling engagement with said cam, and an external operating handle of elongated shape arranged to rotate the cam and to be disposed horizontally when the cam is in a coupling position and to be turned to an inclined position to rotate the cam from said coupling position to release the device, said cam having two lobes disposed on opposite sides of said axis and spaced apart in a direction parallel to the latter, said lobes respectively presenting first and second surface portions of the cam, the first of which trails the axis during the fastening operation, and said keeper having similarly spaced apart first and second surface portions for engagement respectively by said first and second surface portions of said cam, the arrangement being such that during the fastening operation engagement of said first surface portions during the fastening operation can turn said cam to said coupling position in which said second surface portions are in coupling engagement and in which the reaction force between said cam and keeper on any tendency for the door to open passes substantially through said axis.

13. A device according to claim 12, including a trip mechanism to hold the handle in its inclined position when the parts are disengaged.

14. A device according to claim 13, wherein the trip mechanism holds the cam in an uncoupled position for engagement within the striker.

15. In a vehicle door having substantially no over-travel past the fastened position during a fastening operation, a releasable fastening device comprising a cam rotatably mounted about an axis extending at right angles to the adjacent edge of the door, a fixed keeper adapted for coupling engagement with said cam, and spring means urging said cam to a coupling position, said cam having two lobes disposed on opposite sides of said axis and spaced apart in a direction parallel to the latter, said lobes respectively presenting first and second surface portions of the cam, the first of which trails the axis during the fastening operation, and said keeper having similarly spaced apart first and second surface portions for engagement respectively by said first and second surface portions of said cam, the arrangement being such that engagement of said first surface portions during the fastening operation turns said cam away from and allows the latter to return to said coupling position with said second surface portions in coupling engagement and in which the reaction force between said cam and keeper on any tendency for the door to open passes substantially through said axis.

References Cited in the file of this patent

UNITED STATES PATENTS

| | | |
|---|---|---|
| 2,143,965 | Van Voorhees | Jan. 17, 1939 |
| 2,159,940 | Endter | May 23, 1939 |
| 2,174,078 | Burgin | Sept. 26, 1939 |
| 3,002,778 | Chanaryn et al. | Oct. 3, 1961 |

FOREIGN PATENTS

Roethel German application, 1,065,749 printed Sept. 17, 1959 (Kl. 68a 91).